(12) United States Patent
Dogan et al.

(10) Patent No.: US 7,720,161 B1
(45) Date of Patent: May 18, 2010

(54) GENERATING TRAINING SEQUENCES IN A COMMUNICATIONS SYSTEM

(75) Inventors: Mithat C. Dogan, Sunnyvale, CA (US); Mitchell D. Trott, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 2475 days.

(21) Appl. No.: 10/191,209

(22) Filed: Jul. 9, 2002

(51) Int. Cl.
H04L 27/00 (2006.01)

(52) U.S. Cl. ..................................... 375/259

(58) Field of Classification Search ............... 375/259, 375/219
See application file for complete search history.

(56) References Cited

U.S. PATENT DOCUMENTS

| | | | |
|---|---|---|---|
| 5,479,444 A | | 12/1995 | Malkamaki et al. |
| 6,931,030 B1 * | | 8/2005 | Dogan .................... 370/509 |
| 2002/0098824 A1 * | | 7/2002 | Wichman et al. ........... 455/403 |

FOREIGN PATENT DOCUMENTS

| EP | 0615352 A1 | | 9/1994 |
|---|---|---|---|
| EP | 615352 A1 | * | 9/1994 |

OTHER PUBLICATIONS

MSN Encarta Dictionary Online, definition of insert. http://encarta.msn.com/dictionary_/insert.html.*
Cambridge Advanced Learner's Dictionary. Dictionaries Online, definition of insert, http://dictionary.cambridge.org/define.asp?key=41021&dict=CALD.*
Arraycomm, Inc., PCT/US03/21091, Jul. 7, 2003, International Search Report.
Dilip V. Sarwate, "Crosscorrelation Properties of Pseudorandom and Related Sequences", Proceedings of the IEEE, IEEE, New York, US, vol. 68, No. 5, May 1980, pp. 593-619, XP000857081.
Fan,P.Z., et al., "Class of binary sequences with zero correlation zone", Electronics Letters, IEE Stevenage, GB, vol. 35, No. 10, May 13, 1999, pp. 777-779, XP006012151.
De Lind Van Wijngaarden, Adrian J., et al., "Frame Synchronization Using Distributed Sequences", IEEE Transactions on Communications. IEEE Inc., New York, US, vol. 48, No. 12, Dec. 1, 2000, pp. 2127-2138, XP001004975.

* cited by examiner

*Primary Examiner*—Kevin M Burd
(74) *Attorney, Agent, or Firm*—Blakely, Sokoloff, Taylor & Zafman LLP

(57) ABSTRACT

Embodiments of the present invention can be used to generate a family of core training sequences having desired cross-correlation and out-of-phase auto-correlation properties for a communications system. The family can be generated by selecting seed sequences, so that the worst-case cross-correlation of the seed sequences is below a first initial threshold and the worst-case out-of-phase auto-correlation of the seed sequences is below a second initial threshold. Then, sequence families can be generated by inserting additional symbols into a corresponding seed sequence. Then, reduced sequence families can be generated by eliminating those sequences from the sequence families that have a worst-case out-of-phase auto-correlation above a third threshold. A sequence is selected from each reduced sequence family, so that the worst-case cross-correlation of the selected sequences is below a fourth threshold.

30 Claims, 5 Drawing Sheets

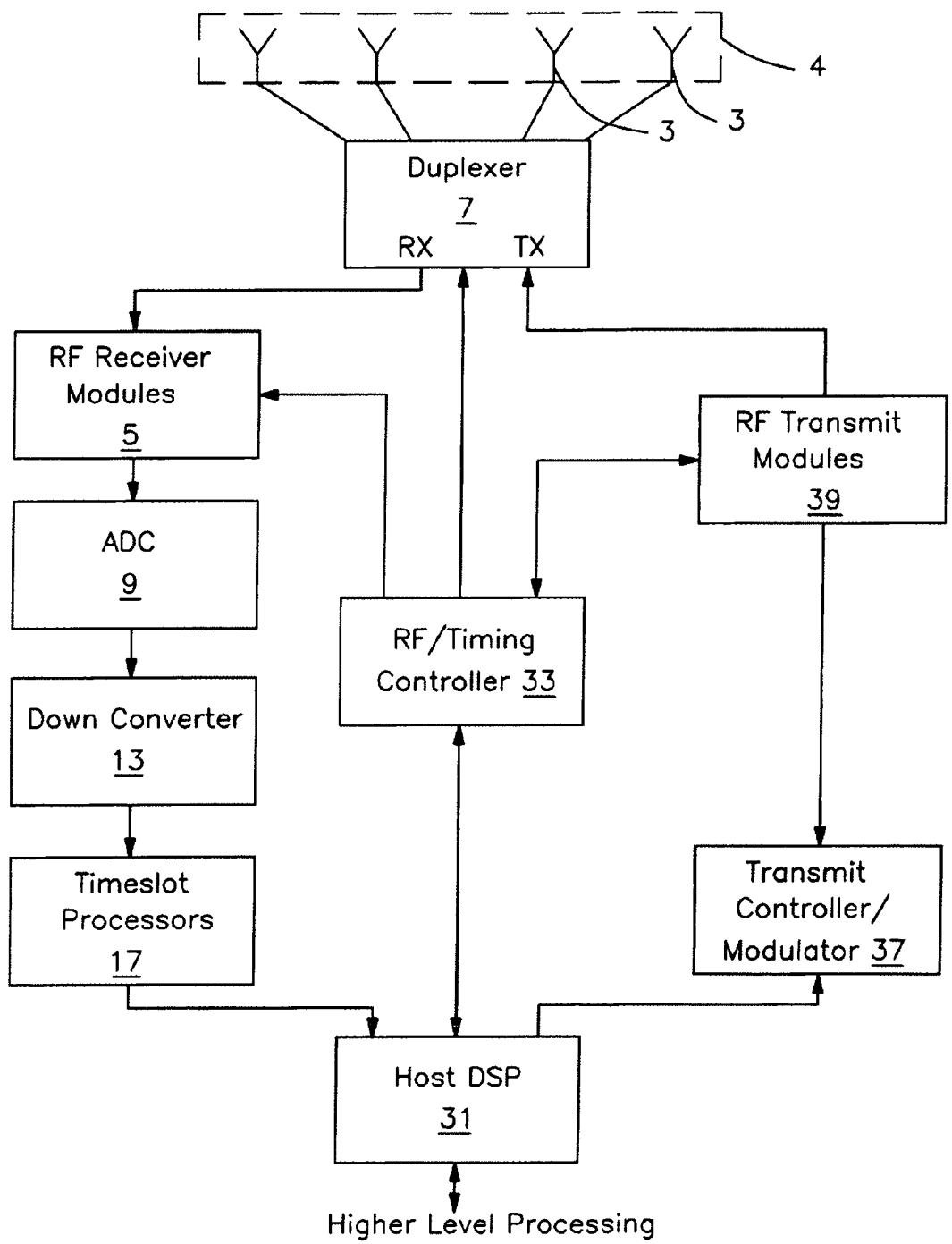
Fig. 4 - PRIOR ART

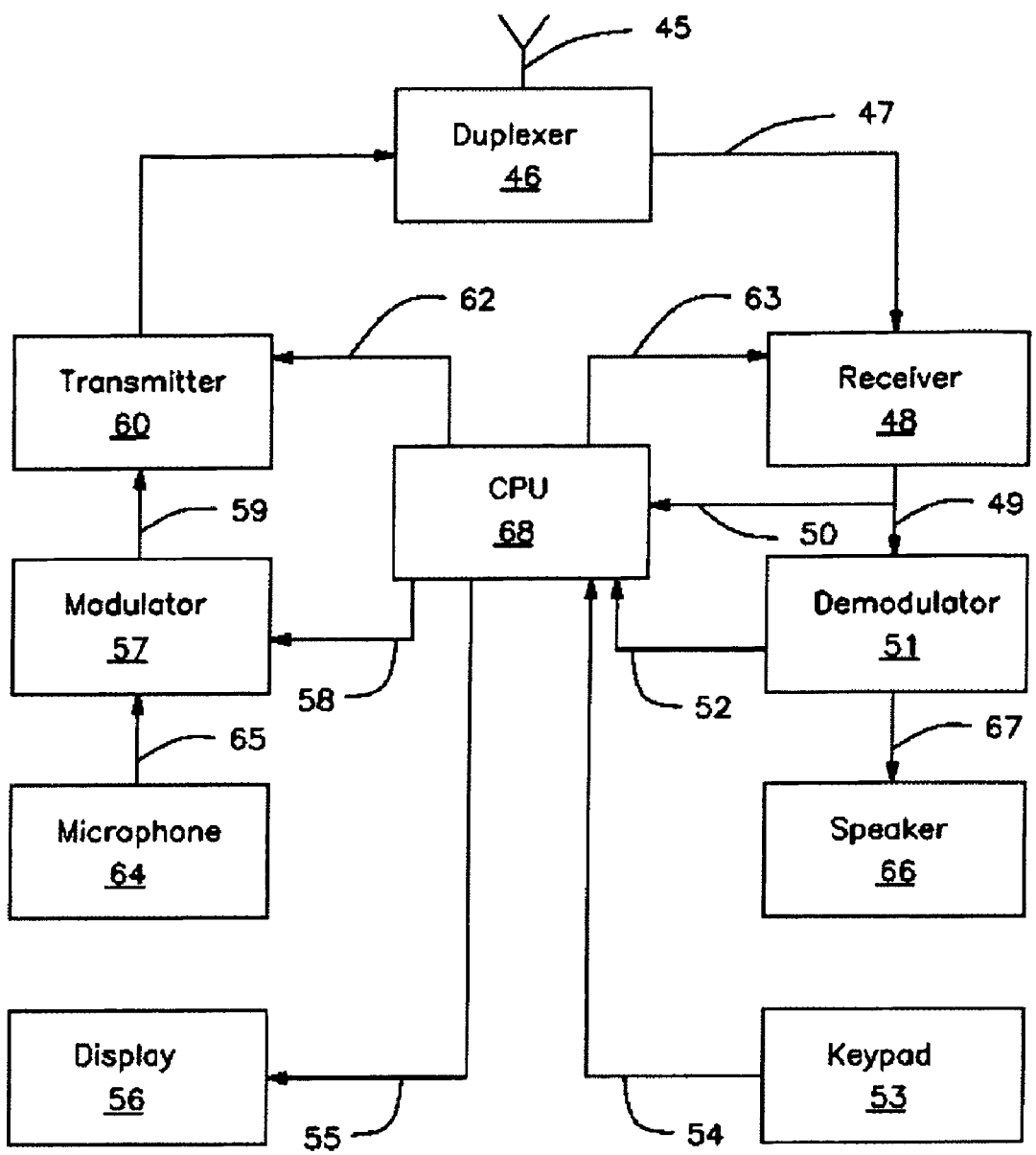
Fig. 5 - PRIOR ART

GENERATING TRAINING SEQUENCES IN A COMMUNICATIONS SYSTEM

BACKGROUND OF THE INVENTION

1. Field of the Invention

The present invention applies to the field of communications systems and, in particular, to training sequences and training signals.

2. Description of the Prior Art

Typical radio communications systems, such as cellular voice and data communications systems, have several base stations in different locations available for use by mobile or fixed user terminals, such as cellular telephones or wireless web devices. Each base station communicates with a user terminal using a communications channel. For example, a communications channel may consist of a time slot in a TDMA (Time Division Multiple Access) frame on a physical carrier frequency. A TDMA frame may contain, for example, three uplink receive time slots followed by three downlink transmit time slots, or vice-versa. The time slots may be used to transmit communication bursts, or they may be delineated on a continuous signal.

A physical carrier frequency may be a 625 kHz band around a central frequency, such as 800 MHz or 1.9 GHz. Thus, a base station transmits to a given user terminal, for example, on the second transmit and receive time slots on this carrier frequency in a given frame. Furthermore, the communications channel may be organized using common duplexing techniques, such as FDD (Frequency Division Duplex) and TDD (Time Division Duplex), and common multiple access techniques such as FDMA (Frequency Division Multiple Access) and CDMA (Code Division Multiple Access). The channel may further be organized according to a hopping function indicating alternating resources over time.

The communications channel can be used for sending signals that communicate information, such as user data and control data. The communications channel may also be used for sending signals that are known at the receiver. Such signals are known as training or pilot signals. A training signal can be generated in many ways, such as sending a known symbol sequence, typically called a training sequence. In portions of the description below, the terms training signal and training sequence may be used interchangeably.

Training signals and training sequences can be used for measuring channel parameters and characteristics, such as SNR (signal to noise ratio), spatial parameters, timing, and frequency offset. They can also be used for synchronizing symbols and frames, calibrating transceivers and equalizers, and calculating spatial and temporal filter weights. One reason training sequences are useful, is that the received signal can be compared with the known sent signal, e.g., the known training sequence. Training sequences are used for "training," which generally means performing some operation including comparing a received signal to a known reference signal. Thus, the above example uses of training signals and training sequences all constitute training.

A well-designed family of training sequences may have some useful or desirable properties. For example, one useful property that a family of training sequences can have is that two different training sequences from the family are as different as possible for all or most shifts. Another useful property that a family of training sequences can have is that a delayed, or shifted, training sequence in the family should be different from the same training sequence without shift. The first property is enhanced if the absolute value of the cross-correlations of any two training sequences is kept small. The second property is enhanced if the out-of-phase auto-correlations of the training sequences are kept small. Different systems may be enhanced by using different tradeoffs between various properties of training sequences, including the size of the sequences and the correlation properties described above.

BRIEF SUMMARY OF THE INVENTION

Embodiments of the present invention can be used to generate a family of core training sequences having desired cross-correlation and out-of-phase auto-correlation properties for a communications system. In one embodiment, the family can be generated by first selecting a plurality of seed sequences, so that the worst-case cross-correlation of the seed sequences is below a first initial threshold and the worst-case out-of-phase auto-correlation of the seed sequences is below a second initial threshold. Then, a plurality of sequence families can be generated by inserting additional symbols into a corresponding seed sequence. Then, a plurality of reduced sequence families can be generated by eliminating those sequences from the sequence families that have a worst-case out-of-phase auto-correlation above a third threshold. The family of core training sequences is then by selecting a sequence from each reduced sequence family, so that the worst-case cross-correlation of the selected sequences is below a fourth threshold.

In another embodiment, a family of core training sequences has a worst-case out-of-phase auto-correlation that is lower than a worst-case cross-correlation of any two training sequences in the family, each training sequence in the family being associated with a corresponding base station of a radio communications network.

BRIEF DESCRIPTION OF THE DRAWINGS

The present invention is illustrated by way of example, and not by way of limitation, in the figures of the accompanying drawings in which like reference numerals refer to similar elements and in which:

FIG. 4 is a simplified block diagram of a base station on which an embodiment of the invention can be implemented; and FIG. 5 is a simplified block diagram of a remote terminal on which an embodiment of the invention can be implemented.

DETAILED DESCRIPTION OF THE INVENTION

According to one embodiment of the invention, a family of core training sequences are generated that have very good out-of-phase auto-correlation properties and good cross-correlation properties. Since shifted versions of the core sequences are used for terminals sharing a conventional channel using SDMA, the worst case out-of-phase auto-correlation of the core training sequences is lower than their worst-case cross-correlation.

Training Sequence Selection

Figure 1:
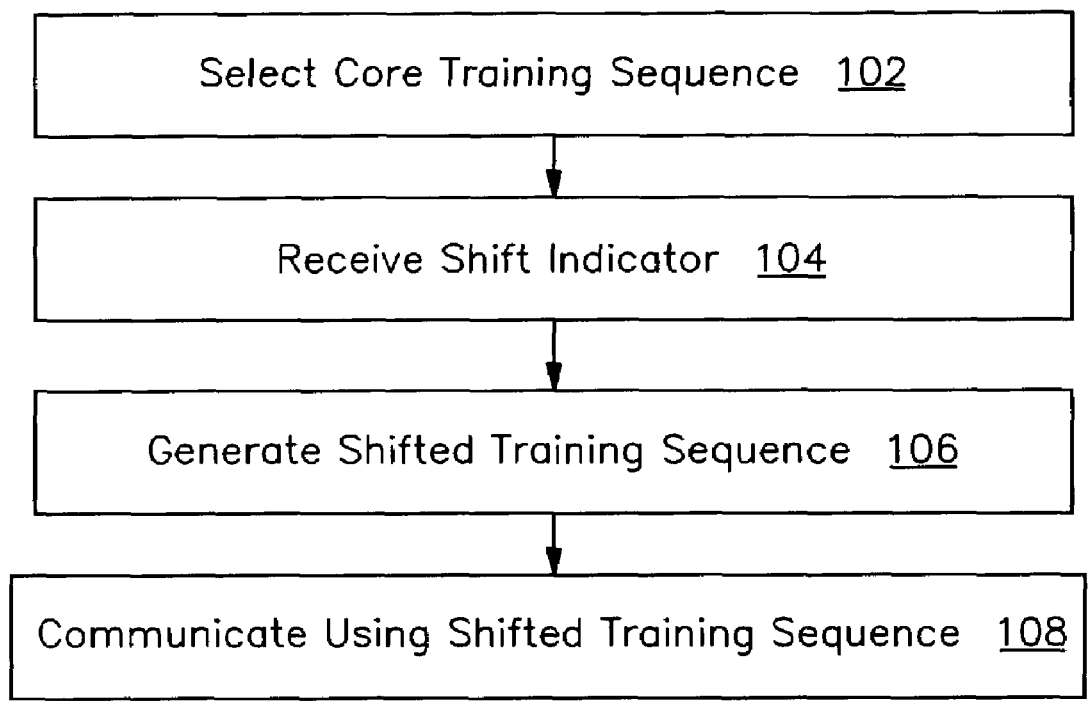
FIG. 1 is a flow chart of selecting a training sequence for use according to one embodiment of the invention.

One embodiment of the present invention can be understood with reference to FIG. 1. FIG. 1 provides a flow chart for selecting a training sequence to compare to a received training segment. In the embodiment described with reference to FIG. 1, a user terminal performs the process. According to FIG. 1, the user terminal first selects 102 a core training sequence, and receives 104 a shift indicator from a base station that indicates the number of symbols by which the core training sequence will be shifted. Then, the user terminal generates 106 a shifted training by performing the shift indicated by the shift indicator, and uses the shifted training sequence to communicate 108 with the base station.

FIG. 1 is now described in more detail. First, the user terminal selects 102 a core training sequence from a set of core training sequences. The set of core training sequences may be the core training sequences described below with respect to FIG. 3, or they may be any other set of core training sequences used by base stations of a communications system. In one embodiment, the user terminal selects the core training sequence based on an identifier of the base station with which the user terminal is communicating.

For example, the user terminal can listen to a Broadcast Channel (BCH) containing a Base Station Color Code (BSCC) and select a core training sequence associated with the BSCC in the network. The BSCCs are used to effectively partition resources, such as physical carriers and training sequences. In one embodiment, there are 32 BSCC used by the system, and also 32 core training sequences to assign to the base stations. In this case, and each base station in the system can be assigned one of 32 BSCCs. Then, each base station can be assigned the core training sequence that corresponds with its BSCC. If there are more than 32 base stations in the network, which is likely in a real-life system, a BSCC does not uniquely identify the base station that it is assigned to. However, the BSCC of a base station does uniquely identify the training sequence used by the base station since there is a one-to-one correspondence between BSCCs and core training sequences. Thus, once a user terminal learns the BSCC of a base station prior to or during registration, the user terminal can select the core training sequence used by the base station.

Furthermore, the user terminal receives 104 a shift indicator from the base station. The shift indicator indicates the amount, i.e., the number of symbols, by which the selected core training sequence should be shifted by the user terminal. The base station also shifts its core training sequence prior to including it in a signal to be sent to the user terminal, thus the shift indicator is sent from the base station to inform the user terminal of the magnitude of the shift. The shifting may be cyclic in order to keep the length of the training sequence constant. For example, cyclically shifting the binary symbol sequence 001101100010 to the left by two symbols results in the shifted sequence 110110001000. Of course, changing the starting point from the first position to the third and reading left to right in a loop has the same effect. The shift indicator can also be applied to the training signal. For example, if the above sequence is modulated such that each symbol takes up 2 s on the burst or waveform to be sent, then delaying or lagging the signal by 4 s has the same effect as shifting the above training sequence by two symbols. If the sequence is repeated, then the lag may be identical to a cyclic shift.

In one embodiment, the "spatial channel assignment," or spatial channel number, of the user terminal determines the shift indicator. As explained above, a communications channel, also known as a conventional channel, can be a frequency band and a time slot in an FDMA/TDMA system, or a frequency band and a spreading code in a CDMA system. However, using adaptive antenna arrays and SDMA (Spatial Division Multiple Access) strategies, two or more user terminals can share a single conventional communications channel for communications with a base station. These new "channels" created using SDMA can be called "spatial channels."

Two user terminals using the same conventional communications channel within a system can be called "co-channel" user terminals. One user terminal is sometimes also referred to as a "co-channel interferer" to the other user terminal. This term is typically used when two co-channel user terminals are communicating with different base stations. When two co-channel terminals communicate with the same base station, they are using different spatial channels. Such terminals are sometimes referred to as "co-spatial" user terminals. Such user terminals are serviced using SDMA to distinguish the different terminals using the different spatial channels constructed from the shared communications channel. The number of co-channel user terminals that can share a communications channel to communicate with the same base station on different spatial channels can vary.

In one embodiment, a maximum of five co-channel terminals can be serviced by one base station on one conventional communications channel. That is, each communications channel can support up to five spatial channels. In this case, the "spatial channel assignment" of a user terminal can be any designation used by the base station to distinguish the user terminal from the other co-channel user terminals the base station is servicing. For example, if the user terminal arrives at the base station at a time when there are already three other terminals sharing the channel to be assigned to the user terminal these other terminals designated as spatial channel 1, spatial channel 2, and spatial channel 3, respectively then the newly arrived user terminal can be designated as either spatial channel 4 or 5. If the user terminal is designated as spatial channel 4, and at some time in the future the user terminal designated as spatial channel 2 leaves the base station, a terminal arriving at this time could be designated as spatial channel 2 or 5. Thus, the spatial channel number can be used to distinguish the co-channel user terminals serviced by one base station.

In one embodiment, the spatial channel assignment directly determines the shift indicator. For example, if a user terminal is designated spatial channel 1, this may mean that the shift indicator indicates a 0-symbol shift, i.e., no shift at all. Similarly, spatial channels 2,3,4, and 5 may directly correspond with a 5, 10, 15, and 20-symbol shift, respectively. Alternately, to improve shift distances, spatial channels 2,3,4, and 5 may directly correspond with a 10, 20, 5, and 15-symbol shift, respectively. In this embodiment, the spatial channel assignment is, in effect, the shift indicator, since it uniquely defines the number of symbols to be shifted. Thus, in this embodiment, receiving a shift indicator is identical to receiving a spatial channel assignment or spatial channel number from the base station.

The precise magnitudes of the various shifts employed can vary depending on the size of the core sequences to be shifted. In one embodiment, the shifts also depend on the number of user terminal sharing a communications channel, i.e., the number of co-channel terminals serviced by the base station. For example, if the there are two co-channel terminals sharing a conventional channel—assuming a sequence length of 64—the first user terminal may use an unshifted core sequence while the second terminal may use a core sequence shifted by 30, for a large separation between the two shifted sequences. If a third user terminal is assigned a spatial channel on the same conventional channel, thus resulting in three co-channel user terminals being serviced by the base station on this conventional channel, then the first user terminal may continue to use the unshifted core sequence, while the second and third terminals may shift the core sequence by 20 and 40 respectively, to maintain large shift differences. Various other ways are possible to allocate shifts.

After the shift indicator is received and the number of symbols to be shifted is known, the user terminal generates 106 a shifted training sequence by performing the shift indicated by the shift indicator. The direction of the shift may be implied, or it may be contained in the shift indicator. In one embodiment, the number contained in the shift indicator is the number of symbols by which the selected core training sequence is to be shifted to the left. In one embodiment, the shifting is cyclic, that is, the front symbols are placed at the back of the sequence.

There are numerous ways of executing the shift to generate the shifted training sequence. An example above showed that cyclically shifting the binary symbol sequence 001101100010 to the left by two symbols results in the shifted sequence 110110001000. Training sequences can be shifted in the same manner. To arrive at this shifted sequence, a user terminal can actually shift the core training sequence stored in memory. In another embodiment, the user terminal can start the sequence in the third position, i.e., with the first 1, and read cyclically. In yet another embodiment, the user terminal can store the sequence twice in a row, i.e., as 001101100010001101100010. Then, starting with the third position, and taking the 12 subsequent symbols results in the shifted sequence. The number of symbols repeated at the end of the sequence need not exceed the maximum shift.

After the shifted training sequence is generated, it is used 108 for communication on the communications channel with the base station. In one embodiment, the base station includes a training signal based on the shifted training sequence in this sent signal. That is, for example, the base station sends a burst including the shifted training sequence as a training segment. Since, as discussed above, the base station uses a shift that is coordinated with the shift done by the user terminal, the shifted training sequence sent from the base station will match the shifted training sequence generated by the user terminal. After the signal is received, the shifted training sequence can be used for training in any traditional way, including for measuring channel and spatial parameters, synchronization, calibration, or the calculation of spatial and temporal filter weights. Also, in one embodiment, the user terminal sends a signal to the base station containing the shifted training sequence for a training segment. The base station may use this training segment for training in manner, including the operations described above.

Figure 2:
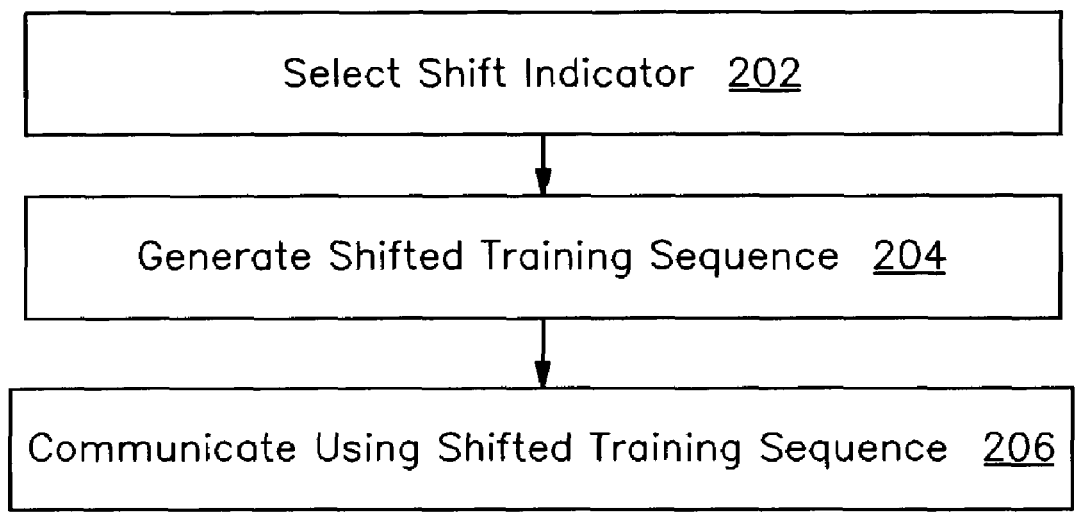
FIG. 2 is a flow chart of shifting a core training sequence according to another embodiment of the invention.

One embodiment of the present invention can be understood with reference to FIG. 2. FIG. 2 provides a flow chart of selecting a training sequence to include in a signal to be sent by a base station. According to FIG. 2, the base station first selects 202 a shift indicator, and generates 204 a shifted training by performing the shift indicated by the shift indicator. Then the base station communicates 206 with a user terminal using the shifted training sequence.

FIG. 2 is now described in more detail. First, the base station selects 202 a shift indicator. The shift indicator is to be used, as above, to indicate the number of symbols a core training sequence is to be shifted. Since the selected shift indicator is communicated to the appropriate user terminal, the description related to receiving 102 the shift indicator in FIG. 1 is applicable to selecting 202 the shift indicator in FIG. 2. That is, in one embodiment, the spatial channel number that the base station assigns to the user terminal with which the base station will use the training sequence directly determines the shift indicator. As explained above, if, for example, the base station assigns spatial channel 3 to a user terminal, the base station has selected a shift indicator indicating a 10-symbol shift. Thus, in this embodiment, selecting a shift indicator is identical to assigning a spatial channel to a user terminal communicating with the base station.

After the shift indicator is selected, the base station generates 204 the shifted training sequence by shifting the core training sequence of the base station in the manner indicated by the shift indicator. Using the example above, if the base station has assigned a user terminal to spatial channel 3, it shifts its core sequence 10 symbols to the left. In one embodiment, the base stations of the communications system each have one core training sequence, thus the base station need not select a core training sequence prior to generating the shifted training sequence because it only has one. In other embodiments, the base station may have multiple core sequences to choose from. Various practical ways of performing the shifting of the core training sequence have been described with reference to FIG. 1 above.

When the shifted training sequence has been generated, it is used for communicating 206 with the appropriate user terminal. That is, the base station may send or receive a signal, such as a burst, to the user terminal including the shifted training sequence. In other words, the shifted training signal can be used to generate a training or pilot signal for the burst to be sent. Phrased yet another way, the shifted training sequence can be inserted for the training segment of the signal about to be sent.

Demonstrative Example

The following example may further clarify the embodiments of the invention described above. The following example is a specific embodiment of the invention including many specific details set forth to illustrate. Other embodiments of the invention are not limited to any of the following details.

In this example communications system, each base station is assigned one core training sequence from a set of core training sequences. The base stations are each assigned a physical carrier set of 8 physical carriers and use three uplink/downlink TDMA time slots per frame for a total of 24 conventional channels. The base stations can service up to five user terminals on each conventional channel using SDMA strategies. In other words, a base station can split a conventional channel into up to five spatial channels, and is thus able to service 120 user terminals simultaneously on the 24 conventional channels. In different systems, there may be different numbers of physical carriers, time slots, and spatial channels per conventional channel.

A base station in the system uses its assigned core sequence for the terminals communicating on different conventional channels, but uses different cyclically shifted versions of its core sequence for the co-channel user terminals communicating with the base station that share a conventional channel. Thus, two terminals communicating using different physical carriers or time slots, but the same spatial channel number, use the same version of the core sequence. However, two terminals communicating using the same physical carrier and time slot, i.e., the same conventional channel, but different spatial channel numbers use different shifted versions of the core training sequence. Because of this, each base station only needs to store one core training sequence.

Two major sources of interference experienced by user terminals in this example system are co-channel interference from other user terminals using the same conventional channel to communicate with other base stations, and interference from the co-channel user terminals using the same conventional channel to communicate with the same base station.

Since the co-channel user terminals that communicate with the same base station are physically closer than the co-channel interferers from terminals at other base stations, this interference is more severe. Therefore, in this example, it is more important that the shifted versions of a core training sequence be more differentiated than the core training sequences themselves. That is, it is more important that the core training sequences have low out-of-phase auto-correlations than it is that they have low cross-correlations. Therefore, the core sequences are selected or designed so that they have these desired properties.

In the present example, there are 32 core training sequences, and 32 Base Station Color Codes (BSCC), one BSCC corresponding with each core training sequence. Each base station is assigned a non-unique BSCC. When possible, two base stations with the same BSCC are not located physically near one another. Each base station stores only the core training sequence corresponding to its BSCC. Each user terminal stores all 32 core sequences. For example, each user terminal stores a lookup table with 32 rows, with each row representing a core sequence and the row number corresponding to the BSCCs.

In this example, when a user terminal arrives at a base station, the user terminal tunes to a Broadcast Channel (BCH) that broadcasts information about the system and the base station, including the BSCC of the particular base station broadcasting on the BCH. During registration, the base station assigns the user terminal to a conventional channel that the user terminal may share with other user terminals using SDMA. To help keep these co-channel terminals distinct, the base station assigns a spatial channel number to the registered user terminal. The number is merely an index, and can be anything that can be used by the base station to uniquely distinguish the user terminal from its co-channel terminals at the base station.

After the base station assigns the spatial channel number to the newly arrived user terminal and communicates the spatial channel number to the user terminal, both the base station and the user terminal know the training sequence to use. The base station will include as a training sequence in signals sent to the user terminal a shifted version of the core sequence, the shift indicated by the spatial channel number. Conversely, the user terminal will expect to receive as a training sequence in signals sent from the base station a shifted version of the core sequence corresponding with the BSCC of the base station, the shift indicated by the spatial channel number.

In a specific demonstrative example, user terminals A, B, and C (UTA, UTB, UTC) arrive at the base station with BSCC 16 (BS16). BS16 stores core training sequence 16 (TS16), where TS16 is the 16 bit binary sequence 1011011110101001. BS16 assigns UTA to conventional channel 5, spatial channel 3, UTB to conventional channel 8, spatial channel 3, and UTC to conventional channel 8, spatial channel 1 respectively. BS16 sends a signal including a 16 bit training sequence to UTA with a 12-symbol cyclic left-shift indicated by spatial channel 3. Thus, the training sequence sent to UTA is 1001101101111010. Since UTB is also assigned a spatial channel number of 3, the same training sequence 1001101101111010 is included in signals sent to UTB. However, BS16 sends a signal including a 16 bit training sequence to UTC with a 4-symbol cyclic left-shift indicated by spatial channel 1. Thus, the training sequence sent to UTC is 0111101010011011. The user terminals expect to receive the correct sequences, because they look up core sequence TS16 after learning that the BSCC of BS16 is 16, and shift TS16 identically to the base station based on the spatial channel number assignment of each user terminal.

Core Training Sequences

As mentioned above, in some embodiments of the present invention, it is desirable that the core sequences assigned to the base stations of the communications system have certain correlation properties. In one embodiment, a base station uses different shifted, i.e. time-delayed or time-lagged, versions of a core sequence as a training sequence for different co-channel user terminals communicating with the base station. Since the interference from these co-channel terminals may be a significant source of interference, in one embodiment, the worst-case absolute value of the out-of-phase auto-correlation of each of the core sequences is kept below a threshold. In one embodiment, the out-of-phase auto-correlation can be defined mathematically by:

$$R_{k,k}(\tau) = \frac{1}{N} \sum_{t=0}^{N-1} S_k^*(t) \cdot S_k(t+\tau) \qquad (1)$$

where N is the length of the core training sequence S, i.e., S has N symbols,
S(t) is a symbol in S with index t, such that 0 t N−1,
S*(t) is the complex conjugate of the symbol S(t),
τ is the shift, delay, or lag of the sequence,
and, in the term S(t+τ), the addition is performed modulo N.

For example, the autocorrelation of sequence $S_k=[a_0, a_1, a_2, a_3]$ delayed, i.e. shifted left, by 1 is $R_{k,k}(1)=\frac{1}{4}(a_0^* \cdot a_1 + a_1^* \cdot a_2 + a_2^* \cdot a_3 + a_3^* \cdot a_0)$ according to Equation 1. The symbols $a_0$-$a_3$ can be complex numbers representing constellation points in a modulation scheme. For example, using a BPSK modulation scheme that maps 0 to −1 and 1 to 1, the bit-sequence 0100 is represented by the symbol sequence [−1, 1, −1, −1]. Similarly, using a QPSK modulation scheme that maps "00" to 1, "01" to j, "11" to −1, and "10" to −j, where j is the imaginary component of a complex number (the square root of −1), the bit-sequence 00101110 is represented by the symbol sequence [1, −j, −1, −j]. Thus, keeping the out-of-phase auto-correlation of a core training sequence below a threshold may be done by ensuring that Equation 1 results in a number below the threshold for all, or most, shift values for τ.

Furthermore, in one embodiment, each base station is assigned one core training sequence from the set of core training sequences. Since co-channel interference may also be a significant source of interference, in one embodiment, the cross-correlation of all, or most, of the core sequences is also kept below a threshold. In one embodiment, the cross-correlation can be defined mathematically by:

$$R_{k,j}(\tau) = \frac{1}{N} \sum_{t=0}^{N-1} S_k^*(t) \cdot S_j(t-\tau) \qquad (2)$$

where N is the length of the core training sequence S, i.e., S has N symbols,
S(t) is a symbol in S with index t, such that 0 t N−1,
$S_k$ and $S_j$ are two different core training sequences,
S*(t) is the complex conjugate of the symbol S(t),
τ is the shift, delay, or lag of a sequence,
k does not equal j,
and, in the term S(t+τ), the addition is performed modulo N.

For example, the cross correlation of core training sequence $S_k=[a_0, a_1, a_2, a_3]$ with another core training sequence $S_j=[b_0, b_1, b_2, b_3]$ delayed by 1 is: $R_{k,j}(1)=\frac{1}{4}(a_0^* \cdot b_1 + a_1^* \cdot b_2 + a_2^* \cdot b_3 + a_3^* \cdot b_0)$ according to Equation 2. Thus, keeping the cross-correlation of the core training sequences below a threshold may be done by ensuring that Equation 2 results in a number below the threshold for all, or most, shift values for $\tau$, and core training sequence pairs $S_k$ and $S_j$.

In one embodiment, the interference for a user terminal from co-channel user terminals at the same base station is more severe than the co-channel interference from terminals at other base stations. In this embodiment, it is more important to minimize the out-of-phase auto-correlations than the cross-correlations. Thus, the threshold for the out-of-phase auto correlations may be lower than the threshold for the cross-correlations. For example, the threshold for the worst-case out-of-phase autocorrelation may be 0.125, while the threshold for the worst-case cross-correlation may be 0.25. Other thresholds may be used depending on the requirements of specific systems.

Various known sequences exist whose mathematical descriptions result in some desirable correlation properties. Some of these sequences include Gold, Kasami, and Kerdock family of sequences. However, these sequences do not satisfy all constraints, including length, number, and correlation thresholds of some practical communications systems.

Figure 3:
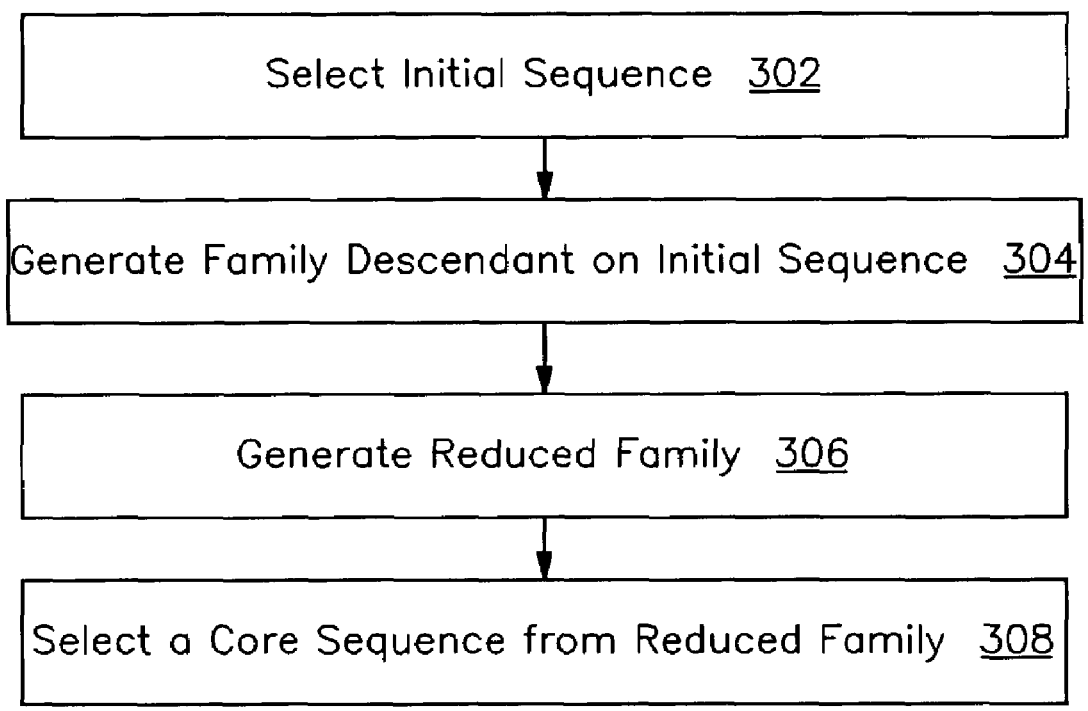
FIG. 3 is a flow chart of generating a core training sequence to be allocated to a base station according to one embodiment of the invention.

One embodiment of the present invention can be understood with reference to FIG. 3. FIG. 3 provides a flow chart of generating a core training sequence to be allocated to a base station in the radio communication system. According to FIG. 3, an initial seed sequence is selected 302 and used to generate 304 a family of sequences from the seed sequence. Then the family is reduced to generate 306 a reduced family from which a core training sequence is selected 308.

FIG. 3 is now described in more detail. First, an initial sequence is selected 302 from an initial set of sequences. This initial set may have some desirable correlation properties, and may be a known sequence family, such as the sequence families mentioned above, or a set generated by a computer search. The selection of the initial sequence may be at random. In one embodiment, the process described with reference to FIG. 3 is repeated for all sequences in the initial set, thus, all sequences in the initial set are eventually selected.

After the initial sequence is selected, it may be used as a seed sequence for generating 304 a family of sequences by inserting additional symbols into the initial seed sequence. This family can be said to be "descended" from the initial seed sequence. In one embodiment, to keep the sequences in this family of equal length, the number of additional symbols inserted is constant for each insertion. In one embodiment, the family may be generated by consecutively inserting every possible sequence of a given number of symbols between every symbol of the initial sequence.

Following is a short binary sequence example to illustrate this embodiment. The initial sequence selected is 0110 and the number of additional symbols to be inserted is two. Then, all the possible supplemental sequences of length two are 00, 01, 10, and 11. The possible places of insertion into the initial sequence, i.e., the three insertion points indicated by ^, are 0^1^1^0. There are four possible supplemental sequences to be inserted at three possible insertion points, resulting in a family of 12 sequences of length six generated from, i.e. descended from, the initial sequence. In this example, those sequences are:

| | | | |
|---|---|---|---|
| 000110 | 001110 | 010110 | 011110 |
| 010010 | 010110 | 011010 | 011110 |
| 011000 | 011010 | 011100 | 011110. |

With such a short initial sequence, some resulting sequences are repeated. Repeated sequences are possible even when starting with longer initial sequences, and may be discarded. The above family of sequences demonstrates the concept of inserting supplemental sequences at insertion points. Many other ways of inserting additional symbols are possible.

After the family of sequences is generated from the selected initial sequence, a reduced family is generated 306 by eliminating some sequences from the family. One elimination criterion may be the maximum value of absolute out-of-phase auto-correlation. For example, any sequence in the family with a worst-case out-of-phase auto-correlation above a threshold is eliminated. This threshold may be 0.125. Other thresholds may be used depending on the specific requirements of the system the core training sequences are being generated for.

Another elimination criterion may be the value of absolute out-of-phase auto-correlation for certain lags, i.e., shifts or delays. For example, any sequence in the family with a worst-case out-of-phase auto-correlation for lags ($\tau$) 1-5 above a second threshold is also eliminated from the family. This threshold can be lower than the first threshold to eliminate additional sequences. For example, the set of lags to choose $\tau$ from may be [0-3] and the second threshold may be 0.05. This test may be repeated several times with different sets of lags and different thresholds. Other thresholds may be used depending on the specific requirements of the system the core training sequences are being generated for.

Yet another elimination criterion may be the absolute value of the mean of the symbols of the sequences. In one embodiment, any sequence with an absolute value mean above some threshold is eliminated. That is, the mean of the symbols, which are complex numbers, of a sequence is calculated, resulting in a complex number. Then, the norm or absolute value of this mean, which is generally a real number, is compared to a threshold. This threshold may be 0.10. Other thresholds may be used depending on the specific requirements of the system the core training sequences are being generated for. Numerous other elimination criteria may be used in combination with, or instead of, the elimination criteria discussed above.

After the reduced family is generated, that is, after the elimination criteria have been applied, a sequence is selected 308 from the reduced family to be assigned to a base station in the radio communications network as a core training sequence. As discussed above, in one embodiment, the cross-correlations of the core training sequences are below a threshold. Since the sequences in the reduced family descend from the same initial seed sequence, their cross-correlations may not be low enough. However, sequences from different reduced families generated from different initial sequences may have better cross-correlation properties. This may be especially true if the initial set of sequences had good cross-correlation properties. Accordingly, in one embodiment, each core training sequence to be assigned to a base station is selected from a different reduced family descendant from a different initial seed sequence.

For example, if there are 32 BSCCs in a system, then the system needs 32 core training sequences, one for each color code. In that case, 32 (or more) reduced families of sequences can be generated based on a set of 32 (or more) initial sequences according to a process described with reference to FIG. 3. Then, in this embodiment, one sequence is chosen from each reduced family in such a manner that these sequences have cross-correlations below a threshold, or that these sequences have the lowest possible cross-correlations. There are many ways of selecting a sequence from each reduced family to achieve these results.

For example, this selection process can begin by selecting a sequence from each reduced family at random, and determining one or more worst-case pairs, that is, those sequence pairs with the highest cross-correlations, among these sequences. Then, one sequence in each of the worst-case pairs can be discarded and replaced with another randomly selected sequence from the reduced family that the discarded sequence was a member of. Now, new worst-case pairs can be determined, and this process can be iteratively repeated until the desired cross-correlations are achieved. The resulting 32 sequences can be designated the 32 core training sequences for the system.

After the core training sequences have been selected from known sequences, collected, or generated by some process, such as the process described with reference to FIG. 3, they can be stored in the base stations and user terminals of the radio communications system. The core training sequences may be stored as mathematical descriptions. However, some core sequences may be impractical or impossible to store as mathematical descriptions. Thus, in one embodiment, a core training sequence, or at least one period of the core training sequence, is stored in memory, such as a memory on a base station like DSP 31 in FIG. 4, as a sequence of symbols. In one embodiment, each base station has one core training sequence assigned to it based on the BSCC of the base station. Thus, only one core training sequence is stored. The base station can use this core training sequence, and shifted versions of this core training sequence, as described with reference to FIG. 2 above.

Since user terminals can be handed off between base stations, in one embodiment, the user terminals in the system store all of the core training sequences in a memory, such as the memory in CPU 68 in FIG. 5. The core training sequences may be stored in a lookup table, with each core training sequence indexed by a BSCC. The user terminals can use these core training sequences, and shifted versions of these core training sequences, as described with reference to FIG. 1 above.

Base Station Structure

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 4 shows an example of a base station of a wireless communications system or network suitable for implementing the present invention. The system or network includes a number of subscriber stations, also referred to as remote terminals or user terminals, such as that shown in FIG. 5. The base station may be connected to a wide area network (WAN) through its host DSP 31 for providing any required data services and connections external to the immediate wireless system. To support spatial diversity, a plurality of antennas 3 is used to form an array 4, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots, for example three timeslots, for the uplink and downlink in each frame. For each of the eight receive timeslots, the four down-converted outputs from the four antennas are fed to a digital signal processor (DSP) 31 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37.

The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7.

User Terminal Structure

FIG. 5 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 4 and 5, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices.

In portions of the description above, the training sequence was sent by the base station to the user terminal. However, embodiments of the present invention may be used on the uplink or the downlink by either a base station or a user terminal, or any other communications device that is not designated as either, as, for example, in a Peer-to-Peer system.

Furthermore, in portions of the description above, operations such as selecting and shifting are performed on a training sequence. However, these operations may be performed at the signal level. In other words, shifting a training sequence by two symbols can be the same as shifting a training signal by 4 s.

Furthermore, in portions of the description above, various example sequences are shown that have certain lengths, i.e., number of symbols. Sequences of other lengths are also discussed. However, embodiments of the present invention may be used with core training sequences, or any other sequence, of any size.

Furthermore, embodiments of the present invention have been described in the context of a wireless radio communications system. However, embodiments of the present invention may be applicable in any communications system, including wired landline systems, such as the telephone system, digital subscriber lines (DSL), and cable television (CATV) system.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method for generating training sequences, the method comprising:
   selecting a seed sequence from a plurality of sequences;
   generating a family of sequences that descends from the seed sequence by inserting additional symbols into the seed sequence;
   generating a reduced family that descends from the seed sequence by eliminating one or more sequences from the family using one or more elimination criteria;
   selecting a sequence from the reduced family to be used as a first core training sequence by a first transceiver.

2. The method of claim 1, further comprising:
   selecting a second seed sequence from the plurality of sequences;
   generating a second family of sequences that descends from the second seed sequence by inserting additional symbols into the second seed sequence;
   generating a second reduced family that descends from the second seed sequence by eliminating one or more sequences from the second family using the one or more elimination criteria;
   selecting a sequence from the second reduced family to be used as a second core training sequence by a second transceiver.

3. The method of claim 2, wherein selecting a sequence from the second reduced family comprises selecting a sequence with a cross-correlation with the first core training sequence below a threshold.

4. The method of claim 2, wherein the first core training sequence and the second core training sequence have a worst-case cross-correlation below a threshold.

5. The method of claim 4, wherein the first core training sequence is assigned to a first base station including the first transceiver and the second core training sequence is assigned to a second base station including the second transceiver, the base stations belonging to a radio communications network.

6. The method of claim 1, wherein generating the reduced family comprises eliminating those sequences from the family that have a worst-case out-of-phase auto-correlation above a first threshold.

7. The method of claim 6, wherein generating the reduced family further comprises eliminating those sequences from family that have an auto-correlation for a set of lags above a second threshold, the second threshold being lower than the first threshold.

8. The method of claim 6, wherein generating the reduced family further comprises eliminating those sequences from the family that have an absolute mean above a third threshold.

9. The method of claim 1, wherein generating the family of sequences that descend from the seed sequence comprises:
   determining a number of additional symbols to be inserted;
   generating a plurality of substitution sequences comprising the determined number of symbols;
   designating a plurality of symbols of the selected sequence as insertion points;
   inserting one or more generated substitutions sequence into the selected seed sequence at one or more designated insertion points.

10. A method comprising:
   selecting a plurality of seed sequences, wherein the worst-case cross-correlation of the seed sequences is below a first initial threshold and the worst-case out-of-phase auto-correlation of the seed sequences is below a second initial threshold;

generating a plurality of sequence families, wherein a sequence family is generated by inserting additional symbols into a corresponding seed sequence;

generating a plurality of reduced sequence families by eliminating those sequences from the sequence families that have a worst-case out-of-phase auto-correlation above a third threshold;

generating a family of core training sequences to be used in a communications system by selecting a sequence from each reduced sequence family, wherein the worst-case cross-correlation of the selected sequences is below a fourth threshold.

11. The method of claim 10, wherein the third threshold is lower than the second initial threshold.

12. The method of claim 10, wherein the fourth threshold is lower than the first initial threshold.

13. The method of claim 10, wherein the fourth threshold is higher than the first initial threshold.

14. The method of claim 10, wherein the third threshold is lower than the fourth threshold.

15. The method of claim 10, wherein the first initial threshold is lower than the second initial threshold, and the third threshold is lower than the fourth threshold.

16. The method of claim 10, wherein generating the plurality of reduced sequence families further includes eliminating those sequences from the sequence families that have an auto-correlation for a set of lags above a fifth threshold, the fifth threshold being lower than the third threshold.

17. The method of claim 10, wherein generating the plurality of reduced sequence families further includes eliminating those sequences from the sequence families that have an absolute mean above a sixth threshold.

18. The method of claim 1, wherein:

a worst-case out-of-phase auto-correlation of the training sequences in the family is lower than a worst-case cross-correlation of any two training sequences in the family, each training sequence in the family being associated with a corresponding base station of a radio communications network.

19. The method of claim 18, wherein a worst-case out-of-phase auto-correlation of the training sequences in the family for a set of lags is lower than the worst-case out-of-phase auto-correlation of the training sequences in the family.

20. The method of claim 19, wherein the set of lags comprises lags zero to an end lag, the end lag being between zero and half of the length of the training sequence.

21. The method of claim 18, wherein an absolute mean of the training sequences in the family is below a threshold.

22. The method of claim 21, wherein the absolute mean is determined for each training sequence in the family by adding the symbols of a selected training sequence together, dividing the resulting number by the number of symbols in the sequence, and taking the absolute value of the resulting number.

23. A method for generating a family of core training sequences for a communications system, the method comprising:

selecting a plurality of seed sequences, wherein the worst-case cross-correlation of the seed sequences is below a first initial threshold and the worst-case out-of-phase auto-correlation of the seed sequences is below a second initial threshold;

generating a plurality of sequence families, wherein a sequence family is generated by inserting additional symbols into a corresponding seed sequence;

generating a plurality of reduced sequence families by eliminating those sequences from the sequence families that have a worst-case out-of-phase auto-correlation above a third threshold;

generating the family of core training sequences by selecting a sequence from each reduced sequence family, wherein the worst-case cross-correlation of the selected sequences is below a fourth threshold.

24. The method of claim 23, wherein the third threshold is lower than the second initial threshold.

25. The method of claim 23, wherein the fourth threshold is lower than the first initial threshold.

26. The method of claim 23, wherein the fourth threshold is higher than the first initial threshold.

27. The method of claim 23, wherein the third threshold is lower than the fourth threshold.

28. The method of claim 23, wherein the first initial threshold is lower than the second initial threshold, and the third threshold is lower than the fourth threshold.

29. The method of claim 23, wherein generating the plurality of reduced sequence families further includes eliminating those sequences from the sequence families that have an auto-correlation for a set of lags above a fifth threshold, the fifth threshold being lower than the third threshold.

30. The method of claim 23, wherein generating the plurality of reduced sequence families further includes eliminating those sequences from the sequence families that have an absolute mean above a sixth threshold.

* * * * *